Patented Nov. 2, 1948

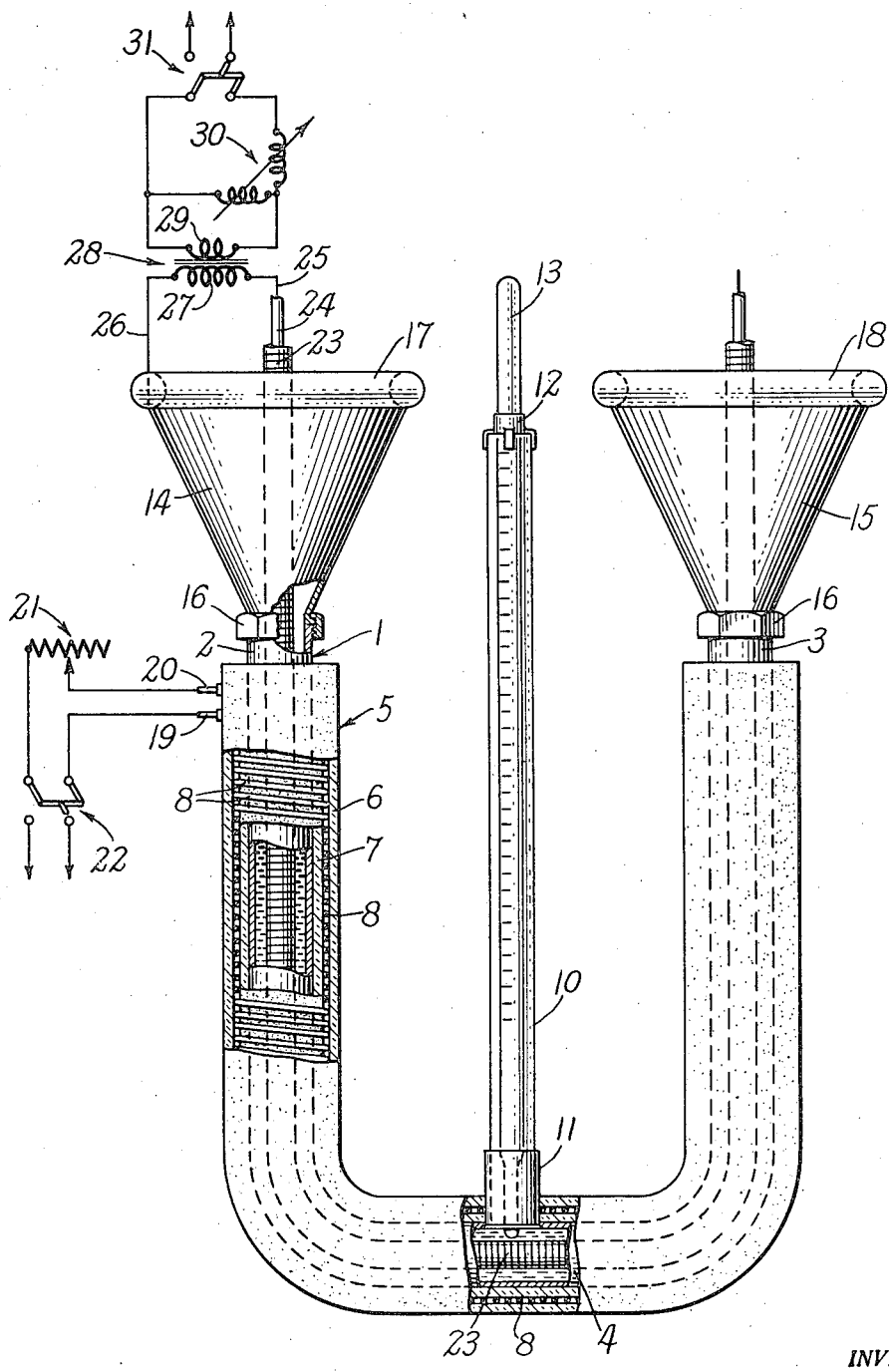

2,452,624

UNITED STATES PATENT OFFICE 2,452,624

APPARATUS FOR TESTING INSULATION OF ELECTRICAL CABLES

Karl H. Zimmermann, Nutley, N. J., assignor to Federal Telephone and Radio Corporation, New York, N. Y., a corporation of Delaware Application June 11, 1945, Serial No. 598,688

1 Claim. (Cl. 175—183)

This invention relates to the testing of the dielectric strength of the insulation on cables or the like. An object of this invention is to provide for the efficient and dependable testing of the breakdown strength of dielectrics on insulated cables. A further object is to provide for such testing with the dielectric immersed in water and at various controlled temperatures. A further object is to provide apparatus for such testing which is simple and sturdy in construction and yet is easy to use and dependable in operation.

The invention accordingly consists in the features of construction, combinations of elements, arrangements of parts and in the several steps and relation and order of each of the same to one or more of the others, all as will be illustratively described herein, and the scope of the application of which will be indicated in the following claim.

In the drawing, the single figure is a side elevation of a test unit forming one embodiment of the invention with parts broken away to show the internal construction, and with certain of the apparatus represented schematically.

The dielectric strength of insulating materials may be tested by placing it between two electrodes and then increasing the potential between the electrodes until there is a breakdown through the dielectric, the breakdown being evidenced by the forming of an electric arc through, or rupture of, the insulating material. With these tests, it is often difficult to determine the exact conditions existing at the point in the dielectric where the breakdown occurs. In this connection, it is pointed out that the dielectric strength of many materials changes inversely with changes in temperature, and therefore, if the insulation material becomes heated at a particular point during the test, the breakdown is apt to occur there. With certain prior test systems, the test operation heats up the insulating material, and often an excessive heating at one point causes the insulating material to become much hotter there than elsewhere. Furthermore, the physical characteristics of the insulating material may vary from point-to-point and in a layer of insulating material the thickness may vary, and all such factors affect the dielectric strength under test. These factors may or may not change the test results correspondingly. The test results are apt to be inaccurate where the test conditions are such that it is difficult to determine the temperature of the dielectric material at the exact point where the breakdown occurs. In addition, it is important to note that with certain prior test systems, the tests are not thorough and may not disclose the weakest point in the insulating material.

When a particular insulating material is to be used only under certain specific conditions, as at a relatively high or a relatively low temperature, it is important that the test be carried on under conditions which simulate the conditions of use. That is, a series of tests at room temperature might give results having no correlation to the results which would be obtained under the conditions of actual use. In accordance with the present invention, the tests care carried on in a simple manner which avoids the difficulties of the prior art and which gives accurate and dependable results.

In the illustrative embodiment of the present invention the dielectric strength of the insulation of a single conductor cable is tested. This conductor forms one electrode; another is needed, and therefore, during test, it is immersed in water. Furthermore, the cable is maintained at a predetermined temperature which is indicated by a thermometer, there being heating means to increase the temperature of the cable. The breakdown normally occurs in the warmest zone, and the arrangement is such that the warmest zone is where the temperature is measured. Furthermore, the warmest zone is below the surface of the water so that the danger of "flash-over" along the surface of the water is avoided.

Referring to the drawing a U-tube 1 of copper tubing has two legs 2 and 3 connected at the bottom by a cross-member 4, and except for the upper ends of the legs, the tube is enclosed in a heating jacket 5. Heating jacket 5 is formed by a pair of concentric coverings 6 and 7 having a heating layer 8 therebetween formed by an evenly spaced winding of high resistance wire. Positioned between the two legs of the U-tube is a thermometer well formed by a glass tube 10 opening at its lower end into U-tube 1 through a sealing ferrule 11. Supported at the top of tube 10 by clip 12 and extending to the bottom of the well into the U-tube is a thermometer 13, which measures and indicates the temperature at the center of the cross-member 4 of the U-tube.

Attached to the upper ends of the two legs 2 and 3 of the U-tube are two funnel-shaped end-bells 14 and 15. Each of these end-bells is attached to its leg, as shown at the left in the figure, by a flanged collar 16 carried by the end-bell and threaded onto a flange at the upper end of the leg. End-bells 14 and 15 are provided at their tops with rings 17 and 18, welded to the respective end-bells. These rings provide a comparatively large radius of curvature and prevent "flash-over" from the top edges of the end-bells.

Electric current is supplied to heater winding as shown schematically at the left, through a pair of leads 19 and 20 connected through an adjustable resistor 21 and a switch 22 to a source of power. The U-tube is filled with water, and a single conductor insulated cable 23 having a wire 24 is shown positioned in the U-tube for test. The temperature of the water at the bottom of the U-tube is indicated by thermometer 13, and resistor 21 is so adjusted as to maintain the desired temperature.

The test potential is impressed between the wire 24 and end-bell 14 so that the wire within the cable is at one potential and the water surrounding the cable is at ground potential. The connections for this high potential are made by a pair of clamps (not shown) and a pair of wires 25 and 26 which extend from the secondary winding 27 of a high potential transformer 28. The primary winding 29 of the transformer is connected through an induction regulator 30 and a switch 31 to a source of alternating current.

As indicated above, with this arrangement the water maintains the insulation on cable 23 at the temperature indicated by thermometer 13 which is at the warmest zone at the bottom of the U-tube; thus, the breakdown will normally occur at the point where the temperature is known. To make a test, the operator closes switch 22 for a sufficient time to heat the water and the cable to the desired temperature. Thereafter, switch 31 is closed with the minimum voltage across the secondary winding 27. The voltage is gradually raised by adjusting the induction regulator until a breakdown occurs at which time switch 31 is opened. The water acts as the outer electrode to impress the voltage over the entire outer surface of the cable. Furthermore, the water insures that the insulating material will be maintained at the desired temperature throughout and no "hot spots" will be created. The end-bells facilitate the filling of the U-tube with water, and "flash-over" from the conductor to the upper edges of the end-bells is prevented by rings 17 and 18. It is understood that with both of the current supply systems more complicated and more accurately controlled arrangements may be provided, but these arrangements are known to those skilled in the art.

As many possible embodiments may be made of the mechanical features of the above invention and as the art herein described might be varied in various parts, all without departing from the scope of the invention, it is to be understood that all matter hereinabove set forth, or shown in the accompanying drawing is to be interpreted as illustrative and not in a limiting sense.

I claim:

In test apparatus of the character described, the combination of, a substantially U-shaped tube having legs adapted to be positioned upright with openings at the upper ends of its legs whereby an insulated conductor may be passed through the tube, a pair of end-bells attached to said upper ends and flaring outwardly therefrom, a heater jacket formed by an electric heater covered by heat-insulating material and substantially enclosing said tube whereby its temperature may be controlled, a tube parallel to said legs and open at its lower end to the central portion of said tube thereby to provide a thermometer-well, and means to impress a test potential between the tube and a conductor placed therein whereby the insulation on the conductor is tested.

KARL H. ZIMMERMANN.

REFERENCES CITED

The following references are of record in the file of this patent:

UNITED STATES PATENTS

| Number | Name | Date |
| --- | --- | --- |
| 1,565,613 | Anderegg | Dec. 15, 1925 |
| 1,721,374 | Dantsizen | July 16, 1929 |
| 1,809,714 | Mathews | June 9, 1931 |
| 1,880,917 | Eastlake | Oct. 4, 1932 |
| 1,944,211 | Brodie | Jan. 23, 1934 |

OTHER REFERENCES

Publication titled "Testing Insulation" in General Electric Review for Nov. 1944.